(12) United States Patent
Yamashima et al.

(10) Patent No.: US 10,320,498 B2
(45) Date of Patent: Jun. 11, 2019

(54) RADIO RECEIVING DEVICE

(71) Applicant: MITSUBISHI ELECTRIC CORPORATION, Tokyo (JP)

(72) Inventors: Masa Yamashima, Tokyo (JP); Kazunari Yamada, Tokyo (JP); Daisuke Saitou, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/097,002

(22) PCT Filed: Jun. 24, 2016

(86) PCT No.: PCT/JP2016/068822
§ 371 (c)(1),
(2) Date: Oct. 26, 2018

(87) PCT Pub. No.: WO2017/221403
PCT Pub. Date: Dec. 28, 2017

(65) Prior Publication Data
US 2019/0132065 A1 May 2, 2019

(51) Int. Cl.
| *H04B 1/16* | (2006.01) |
| *H04B 7/08* | (2006.01) |
| *H04H 20/26* | (2008.01) |
| *H04W 52/24* | (2009.01) |
| *H04W 52/22* | (2009.01) |
| *H04B 1/10* | (2006.01) |
| *H04B 17/29* | (2015.01) |

(52) U.S. Cl.
CPC .................................. *H04B 17/29* (2015.01)

(58) Field of Classification Search
CPC . H04B 17/29; H04B 7/08; H04B 1/16; H04B 1/10; H04H 20/26; H04H 20/34; H04H 60/43; H04W 52/24; H04W 52/28; H04W 52/22; H04N 5/44; H03J 7/18; H04J 1/00
See application file for complete search history.

(56) References Cited

U.S. PATENT DOCUMENTS

| 7,551,699 B2* | 6/2009 | Reichgott | H04B 7/022 375/347 |
| 7,852,902 B2* | 12/2010 | Reial | H04B 1/712 375/130 |
| 7,876,807 B2* | 1/2011 | Ray | G01S 19/22 375/136 |
| 7,885,628 B2* | 2/2011 | Kobayashi | H04B 1/1027 375/308 |

(Continued)

FOREIGN PATENT DOCUMENTS

| JP | 2001-60849 A | 3/2001 |
| JP | 2006-25136 A | 1/2006 |

(Continued)

*Primary Examiner* — Pablo N Tran
(74) *Attorney, Agent, or Firm* — Birch, Stewart, Kolasch & Birch, LLP (57) ABSTRACT

The influence of a multipath noise and an adjacent interference noise on the quality of reception of a broadcast is indexed in accordance with a received electric field strength level, and a broadcast station which is a station selection target is searched for using this index value.

2 Claims, 5 Drawing Sheets

(56) References Cited

U.S. PATENT DOCUMENTS

| | | | | |
|---|---|---|---|---|
| 8,270,928 B2* | 9/2012 | Axtmann | | H04B 1/1027 |
| | | | | 381/13 |
| 8,948,715 B2* | 2/2015 | Bakhri | | H04B 1/16 |
| | | | | 455/150.1 |
| 9,025,620 B2* | 5/2015 | Lee, II | | H04L 1/0041 |
| | | | | 370/203 |
| 9,577,609 B2* | 2/2017 | Jaisimha | | H03J 1/0066 |
| 9,838,053 B2* | 12/2017 | Thomas | | H03J 1/0008 |
| 10,122,482 B1* | 11/2018 | Jacob | | H04H 20/93 |
| 2009/0202024 A1* | 8/2009 | Inoue | | H04B 1/1081 |
| | | | | 375/347 |
| 2010/0151809 A1* | 6/2010 | Jaisimha | | H03J 1/0008 |
| | | | | 455/303 |
| 2015/0126144 A1* | 5/2015 | Jaisimha | | H03G 3/3026 |
| | | | | 455/200.1 |

FOREIGN PATENT DOCUMENTS

| | | |
|---|---|---|
| JP | 2007-60624 A | 3/2007 |
| JP | 2013-16960 A | 1/2013 |

* cited by examiner

| Multipath | Adjacent Interference | Point |
|---|---|---|
| 0 to 0.5 | 0 to 0.5 | 0 |
| 0.5 to 1.0 | 0.5 to 1.0 | 1 |
| 1.0 to 2.0 | 1.0 to 2.0 | 2 |
| 2.0 to 3.0 | 2.0 to 3.0 | 3 |
| 3.0 to | 3.0 to | 4 |

FIG. 4

| Level Range [dBμV] | Parameter f | Parameter g |
|---|---|---|
| 0 to 39 | 0 | 1 |
| 40 to 49 | 2 | 1.2 |
| 50 to 59 | 3 | 1.4 |
| 60 to | 4 | 1.6 |

FIG. 7

RADIO RECEIVING DEVICE

TECHNICAL FIELD

The present invention relates to a radio receiving device having a function of searching for a receivable broadcast station.

BACKGROUND ART

In a vehicle-mounted radio receiving device, the received electric field strength varies as the vehicle moves. When the received electric field strength of a broadcasting signal is at a strong electric field level, a high-quality radio sound can be outputted because the S/N ratio is good. In contrast, when the received electric field strength is at a weak electric field level, the noise component quantities of a multipath noise and an adjacent interference noise in the broadcasting signal have larger variations than those in the case of an intermediate electric field level or a strong electric field level.

Conventional radio receiving devices include a radio receiving device that makes a broadcast station search in consideration of variations in the noise component quantities of a multipath noise and an adjacent interference noise which correspond to the received electric field strength level of a broadcasting signal. For example, in a broadcasting receiver described in Patent Literature 1, a multipath noise and an adjacent interference noise which are detected from a broadcasting signal are converted into DC voltages, and a summed DC voltage which is the sum of these DC voltage values is used as a trigger signal for a search start. When the received electric field strength of a broadcast is at a weak electric field level, it is determined that the reception state gets worse when the average of the summed DC voltage becomes equal to or greater than a threshold, and a search for a broadcast station is started.

CITATION LIST

Patent Literature

Patent Literature 1: Japanese Unexamined Patent Application Publication No. 2001-60849

SUMMARY OF INVENTION

Technical Problem

However, the influence of a multipath noise and an adjacent interference noise on the quality of reception of a broadcasting signal differs dependently on the received electric field strength level of the broadcasting signal. Therefore, there is a problem is that because in the value which is the result of simply adding the noise component quantity of a multipath noise and the noise component quantity of an adjacent interference noise, the influence depending on the received electric field strength level is not taken into consideration, a broadcast station which is a station selection target cannot be correctly searched for.

The present invention is made in order to solve the above-mentioned problem, and it is therefore an object of the present invention to provide a radio receiving device that can properly search for a broadcast station which is a station selection target.

Solution to Problem

A radio receiving device according to the present invention includes a processor to execute a program, and a memory to store the program which, when executed by the processor, performs processes. The processes include determining a received electric field strength level of a broadcast. The processes include providing a multipath noise and an adjacent interference noise which are detected from a broadcasting signal with point values corresponding to respective noise component quantity ranges of the multipath and adjacent interference noises. The processes include having arithmetic expressions in each of which influence of a multipath noise and an adjacent interference noise on quality of reception of a broadcast is indexed, for respective received electric field strength levels, selecting an arithmetic expression corresponding to the received electric field strength level determined from among the arithmetic expressions, and calculating an index value by substituting the point values provided into the selected arithmetic expression. The processes include, when the index value calculated is less than a threshold, determining that a broadcast station for which the index value is acquired is a station selection target, whereas when the index value is equal to or greater than the threshold, excluding a broadcast station for which the index value is acquired from station selection targets.

Advantageous Effects of Invention

According to the present invention, the influence of a multipath noise and an adjacent interference noise on the quality of reception of a broadcast is indexed in accordance with a received electric field strength level, and a broadcast station which is a station selection target is searched for using this index value. As a result, because the influence of a multipath noise and an adjacent interference noise on the quality of reception of a broadcast is determined in accordance with a received electric field strength level, a broadcast station which is a station selection target can be properly searched for.

DESCRIPTION OF EMBODIMENTS

Figure 1:
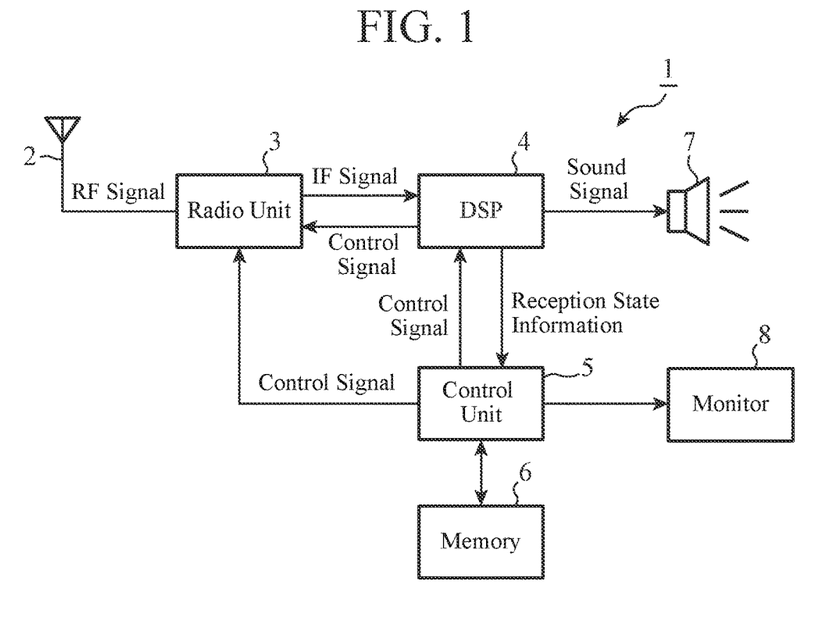
FIG. 1 is a block diagram showing the configuration of a radio receiving device according to Embodiment 1 of the present invention.
Figure 2:
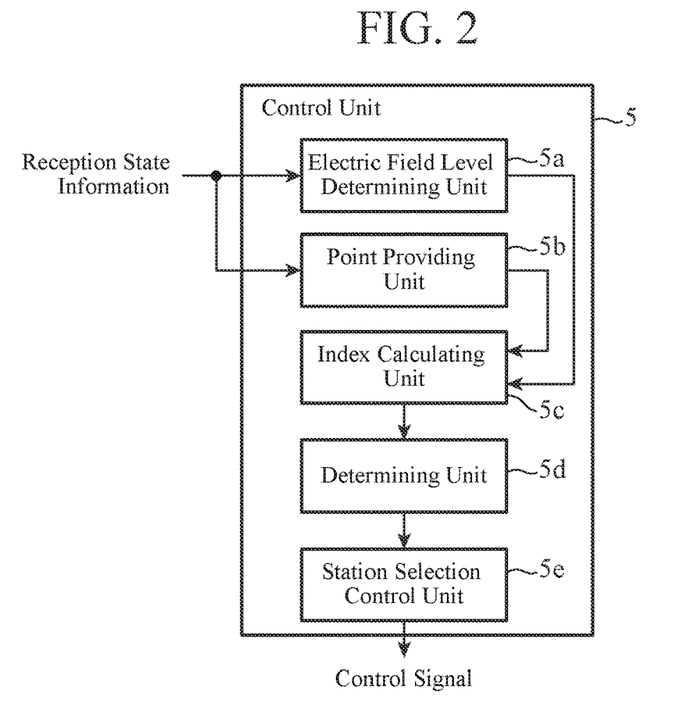
FIG. 2 is a block diagram showing the configuration of a control unit in Embodiment 1.
Figure 3:
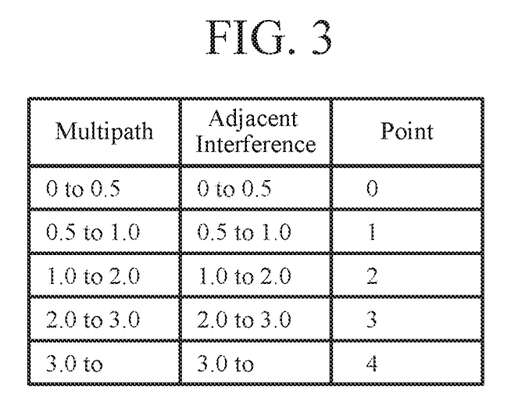
FIG. 3 is a diagram showing a relation between noise component quantity ranges of a multipath noise and an adjacent interference noise, and a point value set to each of the noise component quantity ranges.
Figure 4:
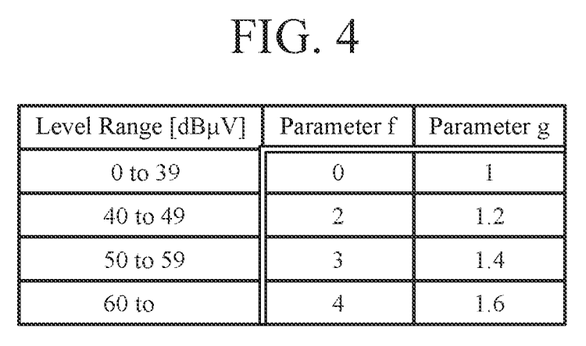
FIG. 4 is a diagram showing a relation between ranges of received electric field strength levels and parameter values set to each of the ranges.

Hereafter, in order to explain this invention in greater detail, embodiments of the present invention will be described with reference to the accompanying drawings.
Embodiment 1
FIG. 1 is a block diagram showing the configuration of a radio receiving device 1 according to Embodiment 1 of the present invention, and shows the hardware configuration of the radio receiving device 1. FIG. 2 is a block diagram showing the configuration of a control unit 5, and shows the functional configuration of the control unit 5. FIG. 3 is a diagram showing a relation between noise component quantity ranges of a multipath noise and an adjacent interference noise, and a point value set to each of the noise component quantity ranges. Further, FIG. 4 is a diagram showing a relation between ranges of received electric field strength levels, and parameter values set to each of the ranges.

The radio receiving device 1 is implemented by car audio equipment having a radio function, or the like, and has, for example, a seek function or a station listing function.

The seek function is to start a search for a broadcast station in response to a specific operation, and, when a receivable broadcast station is found, automatically select this broadcast station. The station listing function is to search for a receivable broadcast station and present a station list which is a list of broadcast stations found in the search to a user. In either of the functions, a broadcast station which is a station selection target is searched for.

The radio receiving device 1 includes an antenna 2, a radio unit 3, a Digital Signal Processor (DSP) 4, the control unit 5, and a memory 6, as shown in FIG. 1.

An RF signal (high frequency signal) which is a broadcasting signal received by the antenna 2 is inputted to the radio unit 3. The radio unit 3 is implemented by a digital radio tuner or an analog radio circuit, and extracts, from the RF signal received by the antenna 2, the RF signal of a broadcast station which is requested to select, and performs frequency conversion of the extracted RF signal into an IF signal (intermediate frequency signal). The DSP 4 performs demodulation processing and sound processing on the basis of the IF signal, thereby generating a sound signal. This sound signal is outputted as a sound from a speaker 7.

The control unit 5 performs a process of making a request of the radio unit 3 for selection of a station, a process of checking the quality of reception of a broadcast, a process of determining a station selection target in the seek function and in the station listing function, and a mute process in the seek function, on the basis of reception state information inputted from the DSP 4. In the reception state information, the received electric field strength, a multipath noise level, an adjacent interference level, and an IF level of the broadcasting signal are included.

It is shown that the higher the multipath noise level, the larger the noise component quantity of the multipath noise included in the broadcasting signal, and the higher the adjacent interference level, the larger the noise component quantity of the adjacent interference noise included in the broadcasting signal. Further, it is shown that the higher the IF level, the larger the deviation of the frequency of the actually received broadcast station from the frequency which is requested to be selected.

Further, the control unit 5 can be implemented by a Central Processing Unit (CPU) or the like. A CPU can function as the control unit 5 by performing processing in accordance with a program stored in the memory 6. The station list, data included in the broadcasting signal, and so on are displayed on the screen of the monitor 8 by the control unit 5.

The control unit 5 includes, as its functional configuration, an electric field level determining unit 5a, a point providing unit 5b, an index calculating unit 5c, a determining unit 5d, and a station selection control unit 5e, as shown in FIG. 2.

The electric field level determining unit 5a determines the received electric field strength level of a broadcast. Concretely, the electric field level determining unit 5a determines whether the received electric field strength level of a broadcast is a weak electric field level, an intermediate electric field level, or a strong electric field level, on the basis of the received electric field strength included in the reception state information. For example, a weak electric field level falls within a level range lower than 30 dBμV, an intermediate electric field level falls within a level range equal to or higher than 30 dBμV and lower than 70 dBμV, and a strong electric field level falls within a level range equal to or higher than 70 dBμV.

The point providing unit 5b provides a multipath noise and an adjacent interference noise which are detected from the broadcasting signal with point values corresponding to their respective noise component quantity ranges.

A point value is set for each of the noise component quantity ranges of a multipath noise and an adjacent interference noise, as shown in FIG. 3, and typifies the noise component quantities included in each of the noise component quantity ranges. For example, even though the noise component quantity of a multipath noise varies within a noise component quantity range, the noise component quantity of the multipath noise is handled using the point value set to this noise component quantity range. As a result, because a variation in the noise component quantity is absorbed, it is possible to make an accurate search for a broadcast station which is a selection target.

Further, although in the example of FIG. 3, the case in which the point value set to each of the noise component quantity ranges for a multipath noise is the same as that set to the corresponding one of the noise component quantity ranges for an adjacent interference noise is shown, mutually different point values can be set. For example, when the degree of influence of a multipath noise is determined to be higher than that of an adjacent interference noise, the point value set to each of the noise component quantity ranges for a multipath noise can be set to be higher than that set to the corresponding one of the noise component quantity ranges for an adjacent interference noise.

The index calculating unit 5c calculates an index value by substituting the point values provided by the point providing unit 5b into an arithmetic expression by which the influence of a multipath noise and an adjacent interference noise on the quality of reception of a broadcast is indexed. Further, in order to index the influence of these noises on the quality of reception of a broadcast for each received electric field strength level, arithmetic expressions set for respective received electric field strength levels are set to the index calculating unit 5c in advance. The index calculating unit 5c selects an arithmetic expression corresponding to the received electric field strength level determined by the electric field level determining unit 5a from among these arithmetic expressions, thereby calculating an index value.

In the case of a weak electric field level, the influence of a multipath noise and an adjacent interference noise on the quality of reception of a broadcast is great. Therefore, in the index calculating unit 5c, in order to make the corresponding index value larger, for example, an arithmetic expression to add or multiply the point value for a multipath noise and the point value for an adjacent interference noise is set as shown in the following equation (1) or (2). In this equation, d is the index value, b is the point value set to the noise component quantity range of a multipath noise, and c is the point value set to the noise component quantity range of an adjacent interference noise.

$$d=b+c \qquad (1)$$

$$d = b \times c \quad (2)$$

In contrast, in the case of a range from an intermediate electric field level to a strong electric field level, the influence exerted by noises is less than that in the case of a weak electric field level. More specifically, while in the case of a weak electric field level, there are many noises in terms of audibility, in the case of a range from an intermediate electric field level to a strong electric field level, the sound may be heard clearly in terms of audibility. Therefore, in the index calculating unit 5c, in order to make the corresponding index value smaller, for example, the following equation (3) or (4) is set as an arithmetic expression.

In this equation, d is the index value, b is the point value set to the noise component quantity range of a multipath noise, and c is the point value set to the noise component quantity range of an adjacent interference noise. Parameters f and g have values set for each received electric field strength level range, as shown in FIG. 4.

$$d = (b+c) - f \quad (3)$$

$$d = (b+c)/g \quad (4)$$

When the index value calculated by the index calculating unit 5c is less than a threshold, the determining unit 5d determines that a broadcast station for which this index value is acquired is a station selection target, whereas when the index value is equal to or greater than the threshold, the determining unit excludes a broadcast station for which this index value is acquired from station selection targets.

For example, in a case in which the received electric field strength level of a broadcast from a broadcast station found in the search is a weak electric field level, the point value b of a multipath noise is 3, and the point value c of an adjacent interference noise is 4, the index value d=7 is calculated when the index calculating unit 5c selects the above-mentioned equation (1) as the arithmetic expression.

Because d≥E when a reference value E for determination which is the above-mentioned threshold is 6, the determining unit 5d excludes this broadcast station from station selection targets.

In contrast, when the received electric field strength level of a broadcast from a broadcast station selected the next time is equal to or greater than 40 dBμV and less than 49 dBμV, the index calculating unit 5c selects the above-mentioned equation (3) or (4) because the received electric field strength level is an intermediate electric field level. In this case, b=3 and c=4, and f=2 and g=1.2 shown in FIG. 4 are substituted into the above-mentioned equation, the index value d=5 or d=5.83 is calculated. Because either of the index values d is less than E=6, the determining unit 5d determines that this broadcast station is a station selection target. As a result, it is possible to make a broadcast station search in consideration of the influence of a multipath noise and an adjacent interference noise, the influence being dependent on the received electric field strength level of a broadcast.

The station selection control unit 5e controls the radio unit 3 in such a way that a broadcast station which is determined to be a station selection target by the determining unit 5d is selected. For example, in the seek function, the station selection control unit 5e controls the radio unit 3 to automatically select a broadcast station found in the previous search from among broadcast stations which are determined to be station selection targets by the determining unit 5d. In the station listing function, the station selection control unit 5e generates a station list of broadcast stations which are determined to be station selection targets by the determining unit 5d, and causes the monitor 8 to display the station list. In a case in which the radio receiving device 1 has a sub-antenna and a sub-radio unit, in addition to the antenna 2 and the radio unit 3, a search made by the sub-radio unit in the background of the receiving operation of the radio unit 3 is also included in the search in Embodiment 1.

Next, operations will be explained.

Figure 5:
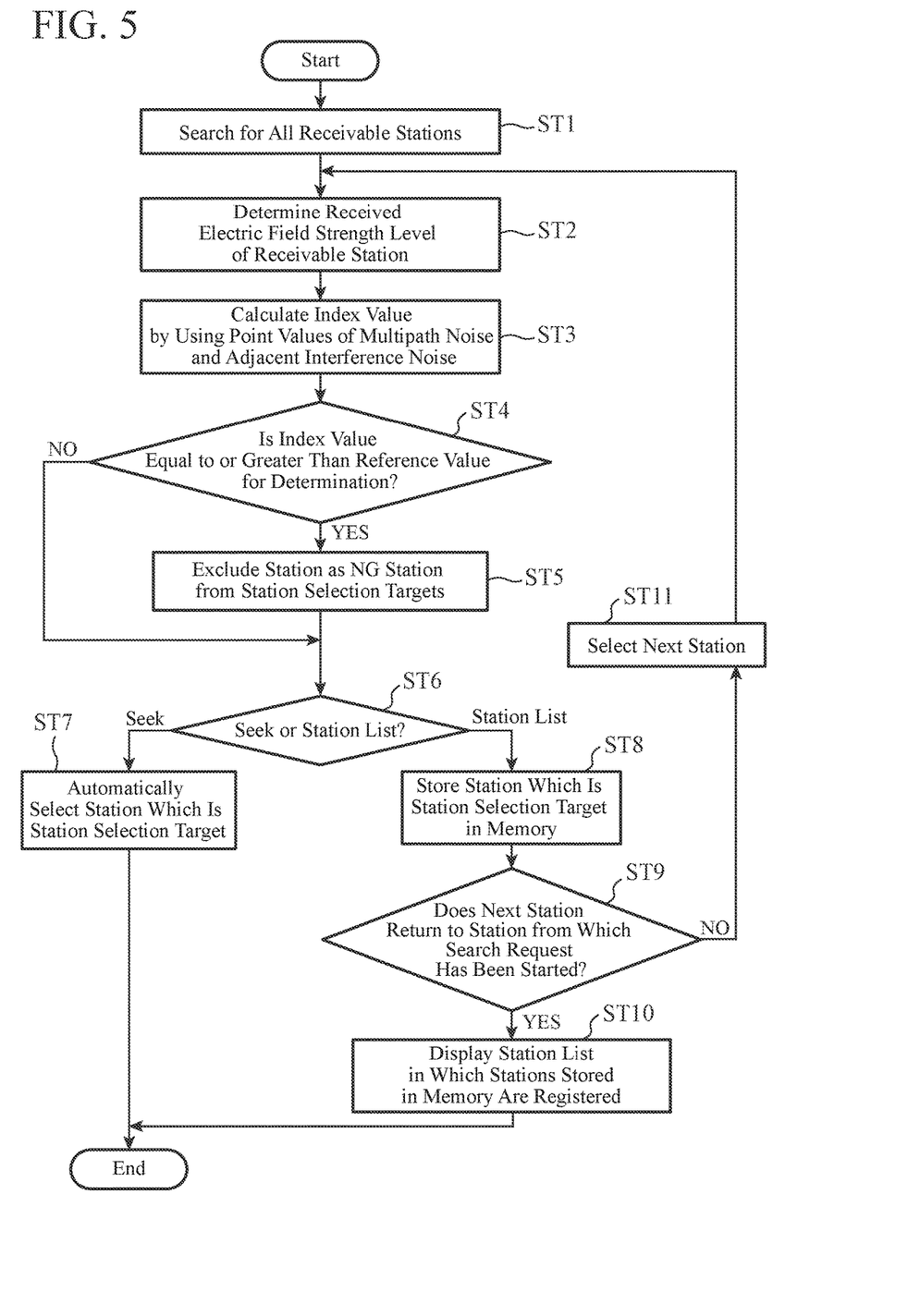
FIG. 5 is a flowchart showing the operation of the control unit in Embodiment 1.

FIG. 5 is a flowchart showing the operation of the control unit 5, and shows a series of processes in the seek function or the station listing function.

First, the station selection control unit 5e causes the radio unit 3 to make a search for all receivable broadcast stations by controlling the radio unit 3 (step ST1). Here, the DSP 4 generates reception state information about a broadcast station selected by the radio unit 3, and the determining unit 5d determines a receivable broadcast station on the basis of a result of comparing the received electric field strength included in this reception state information with a threshold. As a result, all broadcast stations each having a received electric field strength level equal to or greater than a weak electric field level are searched for.

The electric field level determining unit 5a determines whether the received electric field strength level of a broadcast is a weak electric field level, an intermediate electric field level, or a strong electric field level on the basis of the received electric field strength included in the above-mentioned reception state information (step ST2). Next, on the basis of the multipath noise level and the adjacent interference level which are included in the reception state information, the point providing unit 5b provides the multipath noise and the adjacent interference noise with point values corresponding to their respective noise component quantity ranges.

Next, the index calculating unit 5c selects an arithmetic expression corresponding to the received electric field strength level determined by the electric field level determining unit 5a from among the arithmetic expressions preset for respective received electric field strength levels.

The index calculating unit 5c then calculates an index value by substituting the point values provided by the point providing unit 5b into the arithmetic expression selected in this way (step ST3).

The determining unit 5d determines whether or not the index value calculated by the index calculating unit 5c is equal to or greater than the reference value for determination (step ST4).

When the index value is less than the threshold (NO in step ST4), the determining unit 5d determines that a broadcast station for which this index value is acquired is a station selection target, and the processing shifts to a process of step ST6.

When the index value is equal to or greater than the threshold (YES in step ST4), the determining unit 5d determines that a broadcast station for which this index value is acquired is an NG station and excludes the broadcast station from station selection targets (step ST5).

When the seek function is performed (seek in step ST6), the station selection control unit 5e automatically selects a broadcast station found in the previous search from among broadcast stations which are determined to be station selection targets by determining unit 5d (step ST7).

In contrast, when the station listing function is performed (station list in step ST6), the station selection control unit 5e stores the broadcast stations determined to be station selection targets in the memory 6 (step ST8).

Next, the station selection control unit 5e checks whether or not the next station returns to the broadcast station from which the search request has been started (step ST9). The series of processes mentioned above is performed by selecting all the broadcast stations found in the search in step ST1 one by one in descending order or ascending order of their reception frequencies. Therefore, the fact that the next station returns to the broadcast station from which the search request has been started shows that the above-mentioned processes have been performed on all the broadcast stations.

Then, when the next station returns to the broadcast station from which the search request has been started (YES in step ST9), the station selection control unit 5e reads the broadcast stations which are station selection targets from the memory 6, thereby generates a station list, and causes the monitor 8 to display the list (step ST10). After that, the processing is ended.

In contrast, when the next station does not return to the broadcast station from which the search request has been started (NO in step ST9), the electric field level determining unit 5a selects the next station (step ST11) and the processing returns to the process of step ST2.

As mentioned above, the radio receiving device 1 according to Embodiment 1 indexes the influence of a multipath noise and an adjacent interference noise on the quality of reception of a broadcast in accordance with a received electric field strength level, and searches for a broadcast station which is a station selection target by using this index value. By doing in this way, the influence of a multipath noise and an adjacent interference noise on the quality of reception of a broadcast is determined in accordance with the received electric field strength level, and thus a broadcast station which is a station selection target can be properly searched for.

Embodiment 2.

Figure 6:
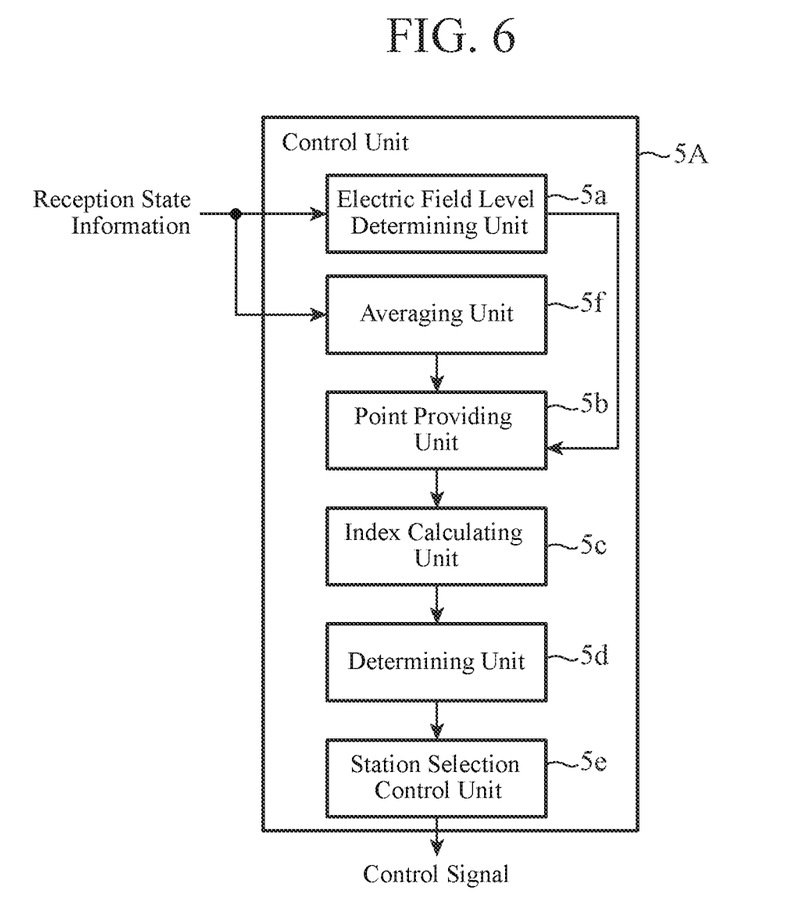
FIG. 6 is a block diagram showing the configuration of a control unit in Embodiment 2 of the present invention.

FIG. 6 is a block diagram showing the configuration of a control unit 5A in Embodiment 2 of the present invention.

The control unit 5A includes, as its functional configuration, an electric field level determining unit 5a, a point providing unit 5b, an index calculating unit 5c, a determining unit 5d, a station selection control unit 5e, and an averaging unit 5f. Here, because the electric field level determining unit 5a, the index calculating unit 5c, and the determining unit 5d operate like the same components shown in FIG. 2, an explanation of their operations will be omitted.

The averaging unit 5f calculates an average of noise component quantities of a plurality of multipath noises and an average of noise component quantities of a plurality of adjacent interference noises, the multipath and adjacent interference noises being detected from a broadcasting signal. The point providing unit 5b provides a point value corresponding to a noise component quantity range in which each of the averages of the noise component quantities is included.

Further, when there is a broadcast station having a weak electric field level, the station selection control unit 5e controls a radio unit 3 to cause the radio unit to detect a plurality of multipath noises and a plurality of adjacent interference noises from a broadcasting signal of this broadcast station.

Next, operations will be explained.

Figure 7:
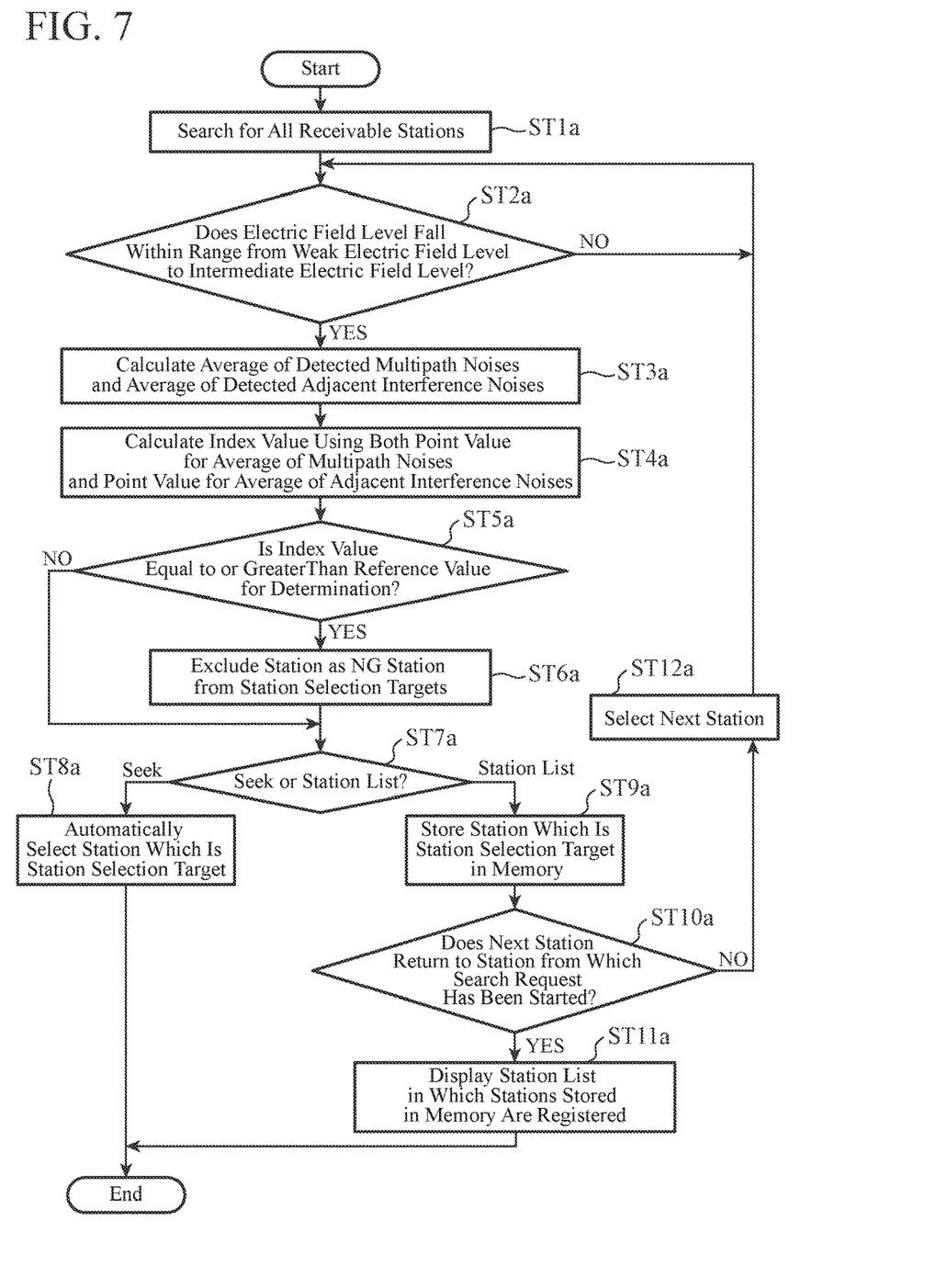
FIG. 7 is a flowchart showing the operation of the control unit in Embodiment 2.

FIG. 7 is a flowchart showing the operation of the control unit 5A, and shows a series of processes in a seek function or a station listing function. A process of step ST1a of FIG. 7 is the same as that of step ST1 of FIG. 5.

On the basis of the received electric field strengths included in reception state information inputted from a DSP 4, the electric field level determining unit 5a determines, out of broadcast stations found in the search in step ST1a, a broadcast station whose broadcast has a received electric field strength level falling within a range from a weak electric field level to an intermediate electric field level (step ST2a). At this time, when the received electric field strength level of the broadcast is a strong electric field level (NO in step ST2a), the process of step ST2a is repeated.

Alternatively, when the received electric field strength level of the broadcast is a strong electric field level, the processing can shift to processes from step ST3 of FIG. 5.

When the received electric field strength level of the broadcast falls within the range from a weak electric field level to an intermediate electric field level (YES in step ST2a), it is determined that a variation in noise component quantities of multipath noises and a variation in noise component quantities of adjacent interference noises are large. Therefore, the station selection control unit 5e causes the radio unit 3 to detect a multipath noise and an adjacent interference noise m times at time intervals of n milliseconds from the broadcasting signal of this broadcast station again by controlling the radio unit 3. The multipath noise level and adjacent interference level which are detected at each time are outputted, as reception state information, from the DSP 4 to the averaging unit 5f.

The averaging unit 5f calculates an average $A_{MPI}$ of the noise component quantities of multipath noises and an average $A_{ASI}$ of the noise component quantities of adjacent interference noises in accordance with the following equations (5) and (6), respectively (step ST3a). $N_M$m is the noise component quantity of a multipath noise, and $N_A$m is the noise component quantity of an adjacent interference noise.

$$A_{MPI}=(N_M1+N_M2+N_M3+\ldots+N_Mm)/m \quad (5)$$

$$A_{ASI}=(N_A1+N_A2+N_A3+\ldots+N_Am)/m \quad (6)$$

The point providing unit 5b provides a point value corresponding to a noise component quantity range in which each of the averages $A_{MPI}$ and $A_{ASI}$ calculated by the averaging unit 5f is included (step ST4a).

For example, in the case of using a relation of FIG. 3 between noise component quantity ranges and point values, a point value b=3 is provided when the average $A_{MPI}$ is 2.5. Further, when the average $A_{ASI}$ is 0.5, a point value c=1 is provided.

Because processes of steps ST5a to ST12a are the same as those of steps ST4 to ST11 of FIG. 5, an explanation of the steps will be omitted.

Further, although in the above-mentioned explanation, the averages of noise component quantities are calculated when the received electric field strength level falls within the range from a weak electric field level to an intermediate electric field level, this embodiment is not limited to this example.

For example, in step ST3a, only when the received electric field strength level is a weak electric field level, the averages of noise component quantities can be calculated, or also when the received electric field strength level is a strong electric field level, the averages of noise component quantities can be calculated.

As mentioned above, the control unit 5A in Embodiment 2 includes the averaging unit 5f that calculates an average of noise component quantities of a plurality of multipath noises and an average of noise component qualities a plurality of adjacent interference noises, the multipath and adjacent interference noises being detected from a broadcasting signal. The point providing unit 5b provides a point value corresponding to a noise component quantity range in which each of the averages the noise component quantities is included.

By configuring in this way, even though a variation in noise component quantities of multipath noises and a variation in noise component quantities of adjacent interference noises are large, the influence of the variations is reduced, and thus a broadcast station which is a station selection target can be properly searched for.

It is to be understood that any combination of two or more of the above-mentioned embodiments can be made, various changes can be made in any component according to the above-mentioned embodiments, and any component according to the above-mentioned embodiments can be omitted within the scope of the invention.

INDUSTRIAL APPLICABILITY

Because the radio receiving device according to the present invention can properly search for a broadcast station which is a candidate for station selection, the radio receiving device is suitable for, for example, a vehicle-mounted radio receiving device in which the receiving environment of a broadcast varies as the vehicle moves.

REFERENCE SIGNS LIST

1 radio receiving device, 2 antenna, 3 radio unit, 4 DSP, 5, 5A control unit, 5a electric field level determining unit, 5b point providing unit, 5c index calculating unit, 5d determining unit, 5e station selection control unit, 5f averaging unit, 6 memory, 7 speaker, and 8 monitor.

The invention claimed is:

1. A radio receiving device comprising:
a processor to execute a program; and
a memory to store the program which, when executed by the processor, performs processes of,
determining a received electric field strength level of a broadcast;
providing a multipath noise and an adjacent interference noise which are detected from a broadcasting signal with point values corresponding to respective noise component quantity ranges of the multipath and adjacent interference noises;
having arithmetic expressions in each of which influence of a multipath noise and an adjacent interference noise on quality of reception of a broadcast is indexed, for respective received electric field strength levels, selecting an arithmetic expression corresponding to the received electric field strength level determined from among the arithmetic expressions, and calculating an index value by substituting the point values provided into the selected arithmetic expression; and
when the index value calculated is less than a threshold, determining that a broadcast station for which the index value is acquired is a station selection target, and when the index value is equal to or greater than the threshold, excluding a broadcast station for which the index value is acquired from station selection targets.

2. The radio receiving device according to claim 1, the processes further comprising calculating an average of noise component quantities of a plurality of multipath noises and an average of noise component quantities of a plurality of adjacent interference noises, the multipath and adjacent interference noises being detected from the broadcasting signal, and
providing point values corresponding to noise component quantity ranges in which the respective averages of the noise component quantities calculated are included.

* * * * *